(12) United States Patent
Miyasaka

(10) Patent No.: US 7,145,733 B2
(45) Date of Patent: Dec. 5, 2006

(54) PROJECTOR AND EXPOSURE ADJUSTMENT METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/081,653

(22) Filed: Mar. 17, 2005

(65) Prior Publication Data

US 2005/0231825 A1  Oct. 20, 2005

(30) Foreign Application Priority Data

Mar. 19, 2004 (JP) ............................. 2004-080424
Mar. 19, 2004 (JP) ............................. 2004-080437

(51) Int. Cl.
*G02B 15/14* (2006.01)
*H04N 5/238* (2006.01)
*G03B 3/00* (2006.01)
*G03B 7/00* (2006.01)

(52) U.S. Cl. ...................... 359/697; 348/364; 353/101; 396/63

(58) Field of Classification Search ................ 359/697, 359/698; 353/100, 101; 348/362, 364; 396/63
See application file for complete search history.

(56) References Cited

U.S. PATENT DOCUMENTS 6,707,500 B1 * 3/2004 Tamura et al. .............. 348/362

FOREIGN PATENT DOCUMENTS

JP        08256288 A  * 10/1996
JP        2000-241874    9/2000

* cited by examiner

*Primary Examiner*—Ricky Mack
*Assistant Examiner*—William Choi
(74) *Attorney, Agent, or Firm*—Oliff & Berridge, PLC

(57) ABSTRACT

The CPU 120 acquires zoom level sent by the zoom lens position detector 122, and on the basis of the acquired zoom level calculates a exposure target value depending on the particular zoom level. The CPU 120 establishes in the imaging controller 105 an exposure target value R calculated depending on zoom level Z, and issues an imaging command to the imaging controller 105. By so doing, the average value of gradation values of the white portion in the imaged image can be substantially maintained at the desired tone level.

5 Claims, 10 Drawing Sheets

Fig.4(A) Fig.4(B) Fig.4(C)
SCREEN
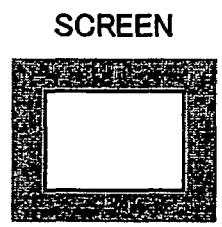
SCREEN
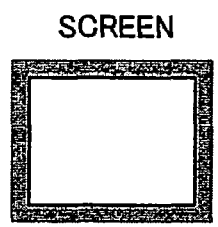
SCREEN
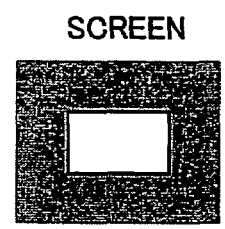
IMAGED IMAGE
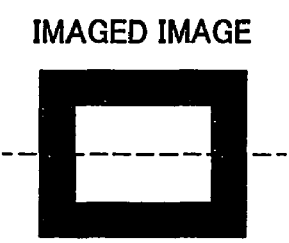
IMAGED IMAGE
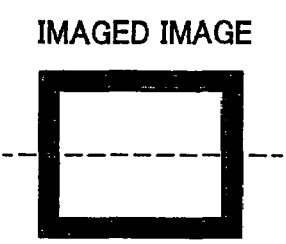
IMAGED IMAGE
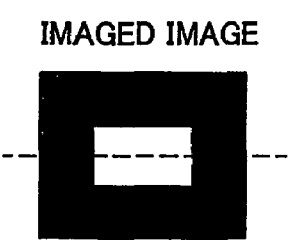
GRADATION VALUE
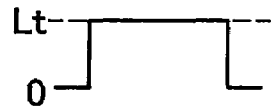
GRADATION VALUE
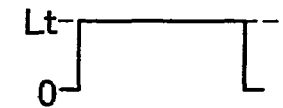
GRADATION VALUE
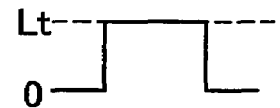

| ZOOM LEVEL Z | EXPOSURE TARGET VALUE R |
|---|---|
| 0 | 43.9 |
| 5 | 45.7 |
| 10 | 47.5 |
| 15 | 49.3 |
| 20 | 51.1 |
| 25 | 53.0 |
| 30 | 54.9 |
| 35 | 56.8 |
| 40 | 58.8 |
| 45 | 60.8 |
| 50 | 62.9 |
| 55 | 64.9 |
| 60 | 67.1 |
| 65 | 69.2 |
| 70 | 71.4 |
| 75 | 73.6 |
| 80 | 75.8 |
| 85 | 78.1 |
| 90 | 80.4 |
| 95 | 82.8 |
| 100 | 85.2 |
| 105 | 87.6 |
| 110 | 90.0 |
| 115 | 92.5 |
| 120 | 95.0 |
| 125 | 97.6 |
| 130 | 100.2 |
| 135 | 102.8 |
| 140 | 105.4 |
| 145 | 108.1 |
| 150 | 110.9 |
| 155 | 113.6 |
| 160 | 116.4 |
| 165 | 119.2 |
| 170 | 122.1 |
| 175 | 125.0 |
| 180 | 127.9 |
| 185 | 130.8 |
| 190 | 133.8 |
| 195 | 136.9 |
| 200 | 139.9 |
| 205 | 143.0 |
| 210 | 146.1 |
| 215 | 149.3 |
| 220 | 152.5 |
| 225 | 155.7 |
| 230 | 159.0 |
| 235 | 162.3 |
| 240 | 165.6 |
| 245 | 169.0 |
| 250 | 172.4 |
| 255 | 175.8 |

| HORIZONTAL SIDE LENGTH w | EXPOSURE TARGET VALUE R |
|---|---|
| 300 | 43.9 |
| 306 | 45.7 |
| 312 | 47.5 |
| 318 | 49.3 |
| 324 | 51.1 |
| 329 | 53.0 |
| 335 | 54.9 |
| 341 | 56.8 |
| 347 | 58.8 |
| 353 | 60.8 |
| 359 | 62.9 |
| 365 | 64.9 |
| 371 | 67.1 |
| 376 | 69.2 |
| 382 | 71.4 |
| 388 | 73.6 |
| 394 | 75.8 |
| 400 | 78.1 |
| 406 | 80.4 |
| 412 | 82.8 |
| 418 | 85.2 |
| 424 | 87.6 |
| 429 | 90.0 |
| 435 | 92.5 |
| 441 | 95.0 |
| 447 | 97.6 |
| 453 | 100.2 |
| 459 | 102.8 |
| 465 | 105.4 |
| 471 | 108.1 |
| 476 | 110.9 |
| 482 | 113.6 |
| 488 | 116.4 |
| 494 | 119.2 |
| 500 | 122.1 |
| 506 | 125.0 |
| 512 | 127.9 |
| 518 | 130.8 |
| 524 | 133.8 |
| 529 | 136.9 |
| 535 | 139.9 |
| 541 | 143.0 |
| 547 | 146.1 |
| 553 | 149.3 |
| 559 | 152.5 |
| 565 | 155.7 |
| 571 | 159.0 |
| 576 | 162.3 |
| 582 | 165.6 |
| 588 | 169.0 |
| 594 | 172.4 |
| 600 | 175.8 |

Fig.11(A)    Fig.11(B)
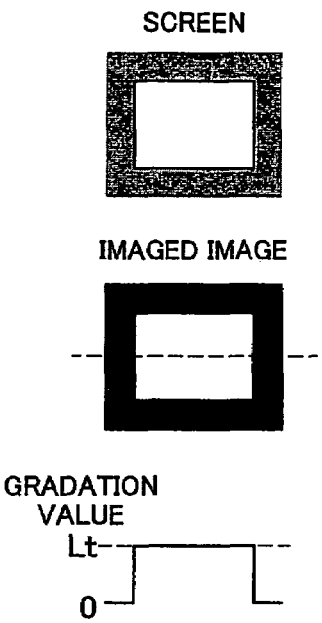 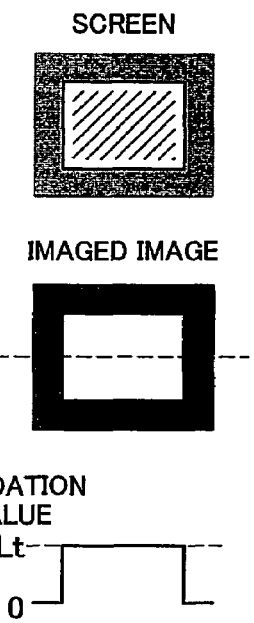
Fig.12(A)    Fig.12(B)    Fig.12(C)
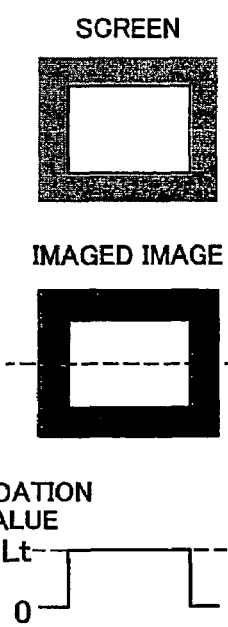 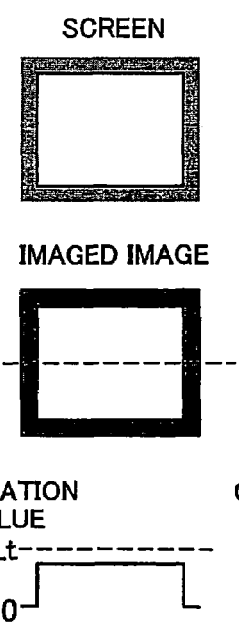 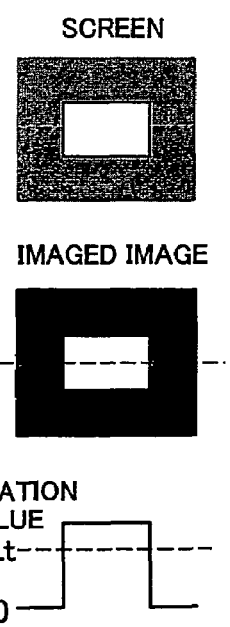

PROJECTOR AND EXPOSURE ADJUSTMENT METHOD

BACKGROUND OF THE INVENTION

1. Field of the Invention

The present invention relates to a projector that projects projection light on a projection object such as a screen to display an image, and in particular relates to a projector equipped with a zoom lens with which the size of the projection light region for projecting projection light can be changed, and an imager for imaging the projection light region.

2. Description of the Related Art

In recent years, a projector equipped with a zoom lens as the projection lens is known where the size of the projection light region formed on the screen can be freely varied by driving the zoom lens to change its zoom position.

Also, when such a projector is positioned in front of a screen, a variety of adjustments need to be made such as zoom adjustment, keystone correction, and focus adjustment on the projector in advance so the image is displayed correctly on the screen by the projection light projected by the projector onto the screen.

With portable projectors, however, the relative position to the screen may change each time the projector is set up, so the operator must make the above such adjustments each time, which is extremely troublesome.

As conventionally described in, for example, Japanese Patent Laid-Open Gazettes No. 2000-241874, when setting up a projector provided with a monitor camera in front of a screen, an adjustment pattern image is projected on the screen, the screen displaying the pattern image is imaged by the monitor camera, the imaged image is analyzed, and the above-mentioned adjustments are carried out automatically based on the results of the analysis.

In general, a monitor camera is provided with a charge-coupled device (CCD) or the like for converting incoming light to electrical signals, and has a function (auto-exposure) for varying the shutter speed, gain (sensitivity), aperture, and the like to make the overall light of the imaged image a set value (exposure target value).

FIG. 11 is an illustration depicting the effect of auto-exposure by a monitor camera of the prior art. At top in FIG. 11 are shown screens displaying adjustment pattern images; in the middle are shown imaged images obtained by imaging the screen with the monitor camera; and at bottom are shown values representing brightness of pixels lined up along a center horizontal line (broken line). (A) shows the condition with the projector in normal mode, and (B) shows the condition with the projector set to low luminance.

Values that represent pixel brightness in a imaged image shall herein be referred to as gradation values. Gradation values are values derived from an image signal of the imaged image output from the monitor camera (CCD module), In FIG. 11, the adjustment pattern image is a completely white image; as shown at top, on the screen, the white portion area displayed as the pattern image is the projection light region mentioned previously.

The imaged image imaged by the monitor camera is as shown in the middle of the drawing.

At bottom in the drawing, the horizontal axis corresponds to pixel location along a center horizontal line through the imaged image, and the vertical axis gives pixel gradation values.

If the lamp which is the light source of the projector has been set to the low luminance setting, the luminance of the projection light projected from the projector will be lower as compared to that in normal operation. Thus, as shown in FIG. 11(B), the brightness of the pattern image displayed on the screen will be darker as compared to the normal operation depicted in (A). However, if the pattern image is imaged with auto-exposure by means of the monitor camera, despite the fact that the subject is dark, the shutter speed, gain, aperture and so on will be adjusted so as to give proper brightness to the imaged image overall, so that in the imaged image, pattern image brightness is no different from that in the normal operation of (A), as shown by FIG. 11(B). Accordingly, in the imaged image, the black portion (i.e. portion outside the projection light region) is dark enough to be ignored, and thus gradation values of pixels situated in the black portion are considered to be "0", whereas thus gradation values of pixels situated in white portion (i.e. in pattern image portion) are substantially unchanged from the desired gradation values Lt.

By means of operating the auto-exposure function of the monitor camera in this way, even in instances where the light source lamp has been set to low luminance so that the pattern image displayed on the screen has low brightness, nonetheless in the imaged image, gradation values of pixels in the white portion (i.e. pattern image portion) can be substantially maintained at the desired gradation values Lt, just as during normal operation. This is true not only at the low luminance setting, but also where the light source lamp has declined in luminance due to degradation over time.

However, in a projector equipped with a zoom lens and a monitor camera, in cases where the zoom position of the zoom lens has been changed resulting in a change in the size of the projection light region on the screen, auto-exposure by the monitor camera results in problems such as the following.

FIG. 12 is an illustration depicting a problem caused by auto-exposure by a monitor camera in the case where zoom position has been changed. In FIG. 12, as in FIG. 11, at top are shown screens displaying adjustment pattern images; in the middle are shown imaged images of the screen; and at bottom are shown gradation values of pixels in the imaged images. (A) shows the condition where the zoom position of the zoom lens has been set to a medial position, (B) shows the condition where the zoom position has been set to the wide angle end, and (C) shows the condition where the zoom position has been set to the telephoto end.

Where the zoom position in the projector has been set to the wide angle end, as shown in FIG. 12(B), the area of the projection light region on the screen will be larger as compared to that medial position of (A), and pattern image displayed thereon will be enlarged as well. Accordingly, when this pattern image is imaged by the monitor camera, as shown at middle in FIG. 12(B), the area of the white portion (i.e. pattern image portion) in the imaged image will be larger as compared to that medial position of (A), and the black portion (i.e. portion outside the projection light region) will have smaller area.

When image is carried out by auto-exposure under these conditions, overall brightness of the imaged image is calculated as the calculated exposure value, whereupon shutter speed, gain, aperture and so on are controlled so as to make this calculated exposure value equal to the preset exposure target value. Here, overall brightness of a imaged image is the sum total of quantities derived by amplification of an electrical signal into which light detected at each pixel in the CCD has been converted; the value is proportional to the average value of gradation values of pixels in the imaged image. Thus, the calculated exposure value is typically the average value of gradation values of all pixels in the imaged image.

Since the exposure target value is a preset fixed value, if the calculated exposure value coincides with the exposure target value when the zoom position is at a medial position as shown in FIG. 12(A), in the event that the zoom position is then changed to the wide angle end so that the area of the white portion become larger, to the extent that these area are larger, the average value of gradation values of all pixels, i.e. the calculated exposure value, will be higher than the exposure target value. As a result, when the auto-exposure operates and changes the shutter speed, gain aperture and so on to make the calculated exposure value equal the exposure target value, the average value of gradation values of all pixels in the imaged image will be lower. As noted, in the imaged image, since the black portion is dark enough to be ignored and gradation values of pixels situated in the black portion are considered to be "0", the fact that the average value of gradation values of all pixels is lower means that gradation values of pixels in the white portion will be lower than the desired gradation value Lt, as shown at bottom in FIG. 12(B).

Conversely, where the zoom position of the zoom lens is at the telephoto end, as shown at top in FIG. 12(C), the area of the projection light region on the screen will be smaller as compared to those at the medial position of (A), and the pattern image displayed thereon will be smaller as well. Accordingly, when the pattern image is imaged by the monitor camera, the area of white portion (i.e. pattern image portion) in the imaged image will be smaller as compared to those at the medial position of (A), and the area of the black portion (i.e. portion outside the projection light region) will be larger.

In this way, in instances where area of the white portion in a imaged image are smaller, the average value of gradation values of all pixels, i.e. the calculated exposure value, will be lower than the exposure target value. As a result, when the auto-exposure operates and changes the shutter speed, gain, aperture and so on to make the calculated exposure value equal the exposure target value, the average value of gradation values of all pixels in the imaged image will be higher, and as a result the gradation values of pixels in the white portion will be higher than the desired gradation value Lt, as shown at bottom in FIG. 12(C).

As described hereinabove, in the past, in the case where the zoom position of a zoom lens is set at the wide angle end so that the area of the projection light region on the screen are larger, auto-exposure by the monitor camera will result a imaged image whose gradation values of pixels in the white portion are lower than the desired gradation value Lt; conversely, in the case where the zoom position of a zoom lens is set at the telephoto end, gradation values of pixels in the white portion will be higher than the desired gradation value Lt. In either case, the average value of gradation values of the white portion cannot be maintained at the desired gradation value Lt.

Accordingly, where the average value of gradation values of the white portion in a imaged image deviates from the desired gradation value Lt due to change in the zoom position of the zoom lens, when subsequently the imaged image is analyzed and various adjustments are made automatically on the basis of the analysis results as mentioned previously, there resulted the problem of inability to make proper settings, depending on the particulars of the adjustment.

This problem is not limited to cases where the adjustment pattern image is entirely white, but can also occur in cases of specific color other than white (such as green, for example), or on cases where some of the image is white rather than all of it.

SUMMARY OF THE INVENTION

Accordingly, it is an object of the present invention to address the drawbacks of the prior art mentioned hereinabove, by providing technology whereby the average value of gradation values in a specific color portion represented by specific color in an imaged image can be maintained at an desired gradation value, irrespective of change in the zoom position of the zoom lens.

In order to attain at least part of the above and the other related objects, the present invention is directed to a first projector for projecting projection light onto a projection target to cause an image to be displayed thereon. The first projector comprises: a zoom lens enabling change of projection light region of projected projection light; a zoom lens position detector that detects zoom position of the zoom lens; a controller; an imager that images the projection target; and an imaging controller that calculates a calculated exposure value from an imaged image imaged by the imager, and performs exposure adjustment in the imager such that the calculated exposure value becomes approximately equivalent to an exposure target value set by the controller, wherein the controller acquires the zoom position detected by the zoom lens position detector, and changes the exposure target value to be set in the imaging controller in accordance with the acquired zoom position.

In this way, the first projector changes the exposure target value with reference to the zoom position of the zoom lens. Accordingly, in the event that, for example, the zoom position is set to the wide angle end so that the area of a specific color portion represented by specific color in the imaged image are larger, while the calculated exposure value calculated from the imaged image in the imaging controller will increase, if the exposure target value also increases in association with zoom position being set to the wide angle end for example, despite the fact that the auto-expose function performs exposure adjustment so to as make the calculated exposure value equal to the exposure target value, the average value of gradation values of all pixels in the imaged image will not decline, so that the average value of gradation values of the specific color portion can be substantially maintained at the desired gradation value. Additionally, in the event that, for example, the zoom position is set to the telephoto end so that the area of the specific color portion in the imaged image are smaller, while the calculated exposure value calculated from the imaged image will decrease, if the exposure target value also decreases in association with zoom position being set to the telephoto end for example, despite the fact that the auto-expose function performs exposure adjustment so to as make the calculated exposure value equal to the exposure target value, the average value of gradation values of all pixels in the imaged image will not increase, so that the average value of gradation values of the specific color portion can be substantially maintained at the desired gradation value.

In the first projector of the invention, the controller may be designed to calculate an exposure target value on the basis of the acquired the zoom position, such that the average value of gradation values of a specific color portion represented by specific color in an imaged image imaged by the imager becomes approximately equivalent to a desired gradation value irrespective of change in the zoom position, and to set the exposure target value in the imaging controller.

In the first projector of the invention, an exposure target value table may be provided in advance. The table has established therein, in association with each zoom position of the zoom lens, exposure target values that make the average value of gradation values of a specific color portion represented by specific color in an imaged image imaged by the imager substantially equal to a desired gradation value irrespective of change in the zoom position. And the controller, on the basis of the acquired zoom position, makes reference to the exposure target value table to derive the exposure target value corresponding to the zoom position, and sets the exposure target value in the imaging controller.

In this way, by calculating exposure target value on the basis of the acquired zoom position, or deriving it from an exposure target value table, and establishing the obtained exposure target value in the imaging controller, the exposure target value can be made to change depending on acquired zoom position, so that the average value of gradation values of a specific color portion can be maintained substantially at the desired gradation value, even if zoom position should change.

The present invention is also directed to a second projector for projecting projection light onto a projection target to cause an image to be displayed thereon. The second projector comprises: a zoom lens enabling change of projection light region of projected projection light; a controller; an imager that images the projection target; and an imaging controller that calculates an calculated exposure value from an imaged image imaged by the imager, and performs exposure adjustment in the imager such that the calculated exposure value becomes approximately equivalent to an exposure target value set by the controller, wherein the controller acquires the imaged image imaged by the imager, and changes the exposure target value to be set in the imaging controller such that the average value of gradation values of a specific color portion represented by specific color in the imaged image becomes approximately equivalent to an desired gradation value.

In this way, the second projector changes the exposure target value such that the average value of gradation values of a specific color portion in an imaged image is substantially equal to a desired gradation value. Accordingly, even if the zoom position of the zoom lens should change, the exposure target value will change in such a way that the average value of gradation values of the specific color portion is substantially equal to the desired gradation value, so that that the average value of gradation values of the specific color portion in the imaged image is substantially equal to the desired gradation value.

The present invention is also directed to a third projector for projecting projection light onto a projection target to cause an image to be displayed thereon. The third projector comprises: a zoom lens enabling change of projection light region of projected projection light; a controller; an imager that images the projection target; and an imaging controller that calculates an calculated exposure value from an imaged image imaged by the imager, and performs exposure adjustment in the imager such that the calculated exposure value becomes approximately equivalent to an exposure target value set by the controller, wherein the controller acquires the imaged image imaged by the imager, derives a parameter related to the area of a specific color portion represented by specific color in the imaged image, and changes the exposure target value to be set in the imaging controller in accordance with the derived parameter.

In this way, the third projector of the invention changes the exposure target value with reference to a parameter related to the area a specific color portion in the imaged image. Accordingly, in the event that for example, the zoom position is set to the wide angle end so that the area of a specific color portion in the imaged image are larger, while the calculated exposure value calculated from the imaged image in the imaging controller-will increase by the equivalent of the larger area, if for example the exposure target value is changed so as to also increase in association with the increase in the parameter in response to the larger area, then despite the fact that the auto-expose function performs exposure adjustment so to as make the calculated exposure value equal to the exposure target value, the average value of gradation values of all pixels in the imaged image will not decline, so that the average value of gradation values of the specific color portion can be substantially maintained at the desired gradation value. Additionally, in the event that, for example, the zoom position is set to the telephoto end so that the area of the specific color portion in the imaged image are smaller, while the calculated exposure value calculated from the imaged image in the imaging controller will decrease by the equivalent of the smaller area, if for example the exposure target value is modified so as to also decrease in association with the decrease in the parameter in response to the smaller area, then despite the fact that the auto-expose function performs exposure adjustment so to as make the calculated exposure value equal to the exposure target value, the average value of gradation values of all pixels in the imaged image will not increase, so that the average value of gradation values of the specific color portion can be substantially maintained at the desired gradation value.

The parameter related to the area of a specific color portion in an imaged image, to which reference is made in the Claims and Specification herein, is not limited to area per se, but could include also the pixels making up a specific color area, i.e. the pixel count of a specific color area, the length of the shape of a specific color area (e.g. where the specific color area is a rectangle, the length of one side), or the like.

In the third projector of the invention, the controller may be designed to calculate an exposure target value on the basis of the derived parameter such that the average value of gradation values of a specific color in an imaged image imaged by the imager becomes approximately equivalent to the desired gradation value irrespective of change in the parameter; and to set the exposure target value in the imaging controller.

Also, in the third projector of the invention, an exposure target value table may be provided in advance. The table has established therein, in association with the parameter, exposure target values that make the average value of gradation values of a specific color portion in an imaged image imaged by the imager substantially equal to a desired gradation value irrespective of change in the parameter. And the controller, on the basis of the derived parameter, makes reference to the exposure target value table to derive an exposure target value corresponding to the parameter, and sets the exposure target value in the imaging controller.

In this way, by calculating exposure target value on the basis of the derived parameter, or deriving it from an exposure target value table, and establishing the obtained exposure target value in the imaging controller, the exposure target value can be made to change depending on the derived parameter, so that the average value of gradation values of a specific color portion can be maintained substantially at the desired gradation value, even if zoom position should change.

The present invention is not limited to the aspect of an apparatus invention like the projector described above, but may also be realized in the aspect of a method invention, such as a method for performing exposure adjustment in the imager of a projector.

BRIEF DESCRIPTION OF THE DRAWINGS

FIG. 4 is an illustration showing gradation values of pixels in the white portion of an imaged image, in an instance where zoom position has been changed.

FIG. 11 is an illustration depicting the effect of auto-exposure by a monitor camera of the prior art.

FIG. 12 is an illustration depicting a problem caused by auto-exposure by a monitor camera in the case where zoom position has been changed.

DESCRIPTION OF THE PREFERRED EMBODIMENTS

Some modes of carrying out the invention are described below as preferred embodiments in the following sequence:

A. Embodiment 1:
A-1. Projector Arrangement:
A-2. Image Projection Operation:
A-3: Target Exposure Value Establishing Operation:
A-4: Effects of Embodiment:
A-5: Modification Examples:
  A-5-1. Modification Example 1:
  A-5-2. Modification Example 2:
  A-5-3. Modification Example 3:
  A-5-4. Modification Example 4:
  A-5-5. Modification Example 5:

B. Embodiment 2:
B-1. Projector Arrangement:
B-2. Image Projection Operation:
B-3: Target Exposure Value Establishing Operation:
B-4: Effects of Embodiment:
B-5: Modification Examples:
  B-5-1. Modification Example 1:
  B-5-2. Modification Example 2:
  B-5-3. Modification Example 3:
  B-5-4. Modification Example 4:
  B-5-5. Modification Example 5:

A. Embodiment 1

Figure 1:
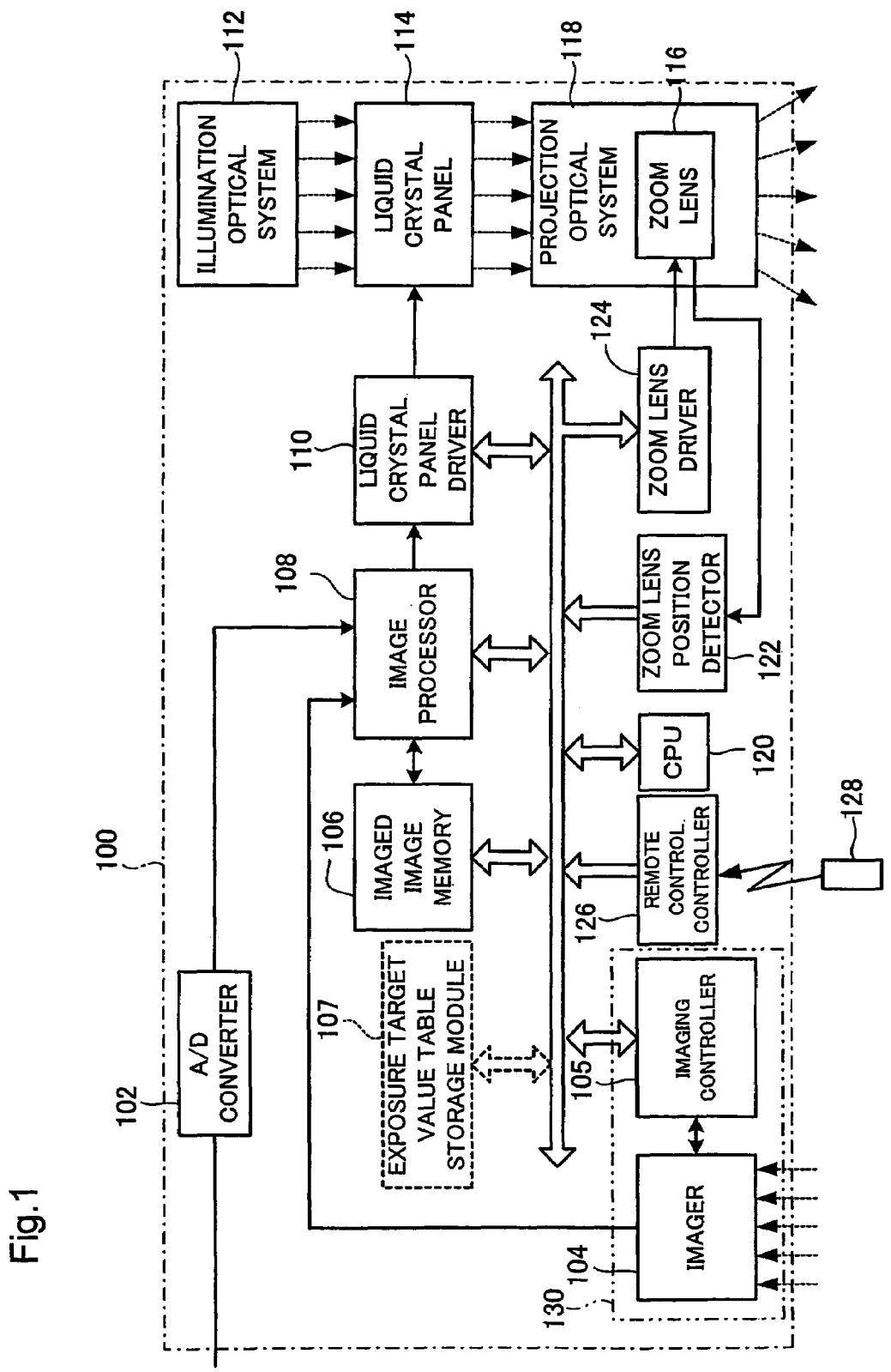
FIG. 1 is a block diagram showing the arrangement of the projector in a first embodiment of the invention.

A-1. Projector Arrangement:

FIG. 1 is a block diagram showing the arrangement of the projector in a first embodiment of the invention. This projector 100 is a portable projector; as shown in FIG. 1 it comprises an A/D converter 102, an imager 104, an imaging controller 105, an imaged image memory 106, an image processor 108, a liquid crystal panel driver 110, an illumination optical system 112, a liquid crystal panel 114, a projection optical system 118 comprising a zoom lens 116, a CPU 120, a zoom lens position detector 122, a zoom lens driver 124, a remote control controller 126, and a remote control 128.

In FIG. 1, the CPU 120 is shown connected, via a bus, to only the imaging controller 105, imaged image memory 106, image processor 108, liquid crystal panel driver 110, zoom lens position detector 122, zoom lens driver 124, and remote control controller 126; in actuality, however, other components are connected as well. The imager 104 comprises a CCD; the imager 104 and imaging controller 105 make up a CCD module 130 which serves as the monitor camera. The zoom lens position detector 122 may be composed of a zoom encoder, for example. In FIG. 1, the exposure target value table storage module 107 will be described later.

In the embodiment, the imager 104 shown in FIG. 1 corresponds to the imager recited in the Claims; the imaging controller 105 to the imaging controller recited in the Claims; the zoom lens 116 to the zoom lens recited in the Claims; the zoom lens position detector 122 to the zoom lens position detector recited in the Claims; and the CPU 120 to the controller recited in the Claims.

A-2. Image Projection Operation:

First, a brief description of the image projection operation which is the normal operation of the projector 100 is provided.

In FIG. 1, when the user, using the remote control 128, issues a command to initiate projection, the remote control 128 sends the input command wirelessly to the remote control controller 126. The remote control controller 126 then sends the command from the remote control 128 to the CPU 120 via the bus. On the basis of the command, the CPU 120 controls various components including the image processor 108, to carry out the image projection operation.

First, the A/D converter 102 inputs an image signal output by a video player, DVD player or the like, or an image signal output from a personal computer or the like, and coverts this analog image signal into a digital image signal, which is output to the image processor 108. The image processor 108 adjusts the input digital image signal so that image display conditions (e.g., luminance, contrast, sync, tracking, color density, tint, etc.) are brought to the desired conditions, and the signal is then output to the liquid crystal panel driver 110.

On the basis of the input digital image signal, the liquid crystal panel driver 110 drives the liquid crystal panel 114. By means of this, the liquid crystal panel 114, in accordance with the image information, modulates the illumination light emitted by the illumination optical system 112. The projection optical system 118 is mounted on the front of the housing of the projector 100, and projects projection light modulated by the liquid crystal panel 114 onto a screen (not shown). The image is projected onto the screen thereby.

A-3: Target Exposure Value Establishing Operation:

The exposure target value establishing operation, which is a characterizing feature of the invention in the projector 100, will now be described in detail.

As noted previously, in the past, the exposure target value used for auto-exposure by the monitor camera was always constant; in the embodiment however, the exposure target value is modified with reference to zoom position, so that the average value of gradation values of the white portion in an imaged image is substantially maintained at the desired gradation value, even if the zoom position of the zoom lens 116 should change.

Once the user has set up the projector 100 at the desired location in front of the screen, when the projector 100 is turned on, the projector 100 projects an adjustment pattern image into the screen in order to perform various adjustments.

Specifically, the image processor 108 generates the adjustment pattern image, which is output as a digital image signal to the liquid crystal panel driver 110. As mentioned previously, the liquid crystal panel driver 110 drives the liquid crystal panel 114 on the basis of an input digital image signal, and the liquid crystal panel 114, in accordance with this image information, modulates the illumination light emitted by the illumination optical system 112. The projection optical system 118 then projects the projection light modulated by the liquid crystal panel 114 onto the screen, via the zoom lens 116 etc. By means of this process, the adjustment pattern image is displayed on the screen.

In the embodiment, an entirely white image is used as the adjustment pattern image, for example. Thus, as shown in FIG. 11 or FIG. 12, the area of the white portion displayed on the screen as the pattern image constitutes the projection light region.

Once the pattern image is displayed on the screen in this way, the user then operates the Zoom button (not shown) of the remote control 128 to issue a command to shift the zoom position, in order to adjust the size of the projection light region on the screen, whereupon the remote control 128 sends the input command wirelessly to the remote control controller 126. The remote control controller 126 then sends the command from the remote control 128 to the CPU 120 via the bus. On the basis of the command, the CPU 120 controls the zoom lens driver 124 to drive the zoom lens 116 provided in the projection optical system 118, shifting the zoom position of the zoom lens 116. Then, once the projection light region on the screen has reached the desired size, the user again operates the Zoom button of the remote control 128 to issue a command to halt shifting of the zoom position, whereupon the CPU 120 controls the zoom lens driver 124 on the basis of the command, to halt shifting of the zoom position of the zoom lens 116. At this time, the zoom lens position detector 122 detects the zoom position of the zoom lens 116, and sends the detection result as zoom level information to the CPU 120. In the embodiment, in the event that the zoom position is at the limit on the telephoto end, a zoom level of "0" is assigned, whereas if it is at the limit on the wide angle end, a value of "255" is assigned.

The CPU 120 also reads from memory (not shown) and executes an exposure target value establishing process program. Specifically, in accordance with the processing routine shown in FIG. 2, the CPU 120 controls components including the imaging controller 105, to carry out the exposure target value establishing operation.

Figure 2:
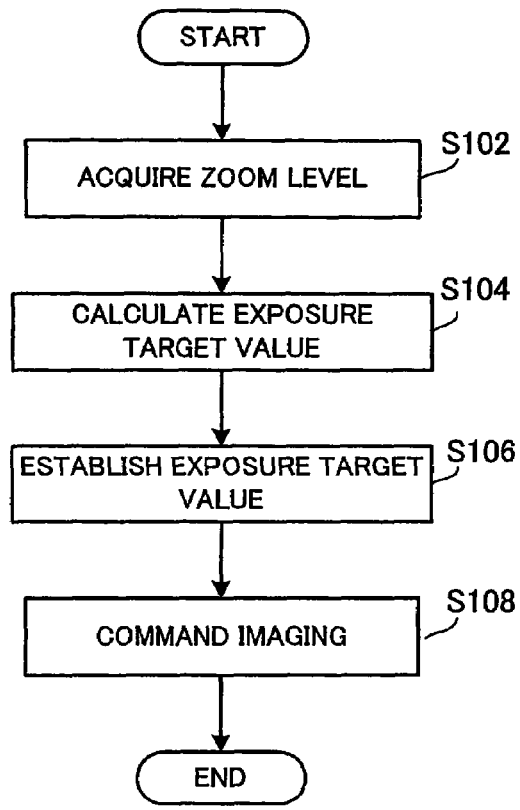
FIG. 2 is a flowchart showing the processing routine of the exposure target value establishing process in the projector of FIG. 1.

FIG. 2 is a flowchart showing the processing routine of the exposure target value establishing process in the projector of FIG. 1.

When the process shown in FIG. 2 is initiated, the CPU 120 acquires the zoom level that has been sent by the zoom lens position detector 122 (Step S102), and on the basis of the acquired zoom level calculates an exposure target value for that zoom level (Step S104). Specifically, exposure target value is calculated with reference to zoom level, by means of the following method. Here, acquired zoom level is denoted as Z, and exposure target value to be calculated is denoted as R.

Figure 3:
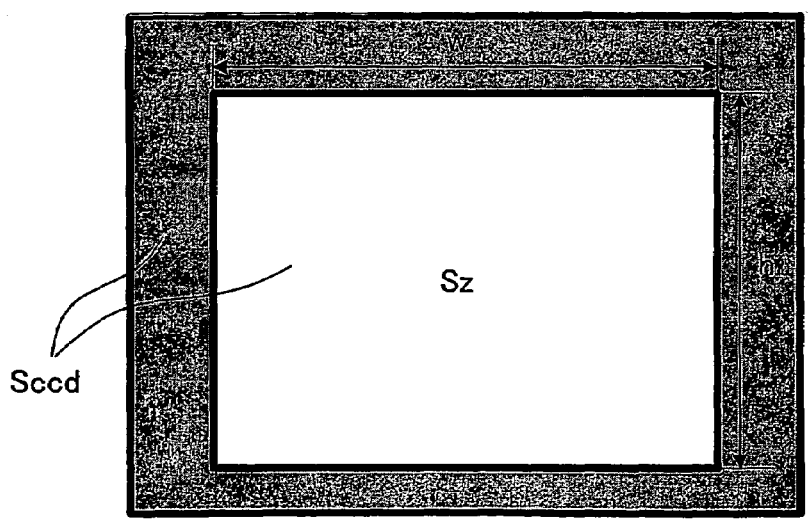
FIG. 3 is an illustration showing an imaged image imaged by a CCD module 130.

FIG. 3 is an illustration showing an imaged image imaged by the CCD module 130. In the embodiment, as described previously, an all-white image is used as the adjustment pattern image, and thus in FIG. 3 the white portion of the imaged image constitutes the projection light region portion, while the black portion constitutes the portion outside the projection light region.

Let it be assumed that, in the imaged image, for the white portion (i.e. projection light region portion), the horizontal side length is denoted as w, the vertical side length is denoted as h, and the area of the white portion as Sz. It is known that, in the relationship of projection light region size to zoom level Z, typically, vertical side length of the projection light region is proportional to the zoom level Z. Accordingly, the horizontal side length w of the white portion is represented by Equation (1).

$$w = k \times Z + w0 \quad (1)$$

k and w0 are constants.

Accordingly, when the area Sz of the white portion is expressed in terms of the zoom level Z, from Equation (1), Sz is given by Equation (2).

$$\begin{aligned} Sz &= w \times h \\ &= K \times w \times w \\ &= K \times (k \times Z + w0)^2 \end{aligned} \quad (2)$$

K is a coefficient that depends on the aspect ratio. For example, where the aspect ratio of the pattern image is 4:3, K=¾.

On the other hand, where the average value of gradation values of the white portion is denoted as L, the area of the entire imaged image is designated as Sccd, and the average value of gradation values of all pixels in the imaged image is designated as Lccd, the average value Lccd is represented by Equation (3).

$$Lccd = Sz \times L / Sccd \quad (3)$$

In an imaged image, since the black portion (i.e. portion outside the projection light region) is dark enough to be ignored, gradation values of pixels situated in the black portion are considered to be 0.

Also, for a portion in an image whose pixel gradation values, while not 0, fall below a certain threshold value for example, the portion may be determined to be outside the projection light region, and calculation performed while substituting "0" for gradation values of the pixels in the portion.

As noted, in auto-exposure, the average value Lccd of gradation values of all pixels in an imaged image is used as the calculated exposure value, adjusting shutter speed, gain, aperture and so on so that the calculated exposure value Lccd is equal to the exposure target value R. Accordingly, by substituting R for Lccd in Equation (3), exposure target value R may be represented by Equation (4).

$$R = Sz \times L / Sccd \quad (4)$$

Accordingly, in order to maintain the average value L of gradation values of the white portion in an imaged image at the desired gradation value Lt irrespective of the zoom position of the zoom lens 116, i.e. of change in the zoom level Z, Lt is substituted for L and the value of Equation (2) for Sz in Equation (4) to derive Equation (5), and exposure target value R depending on zoom level Z is calculated according to Equation (5).

$$R = K \times (k \times Z + w0)^2 \times Lt / Sccd \quad (5)$$

Next, the CPU 120 establishes in the imaging controller 105 this exposure target value R that has been calculated according to zoom level Z (Step S106), instructs the imaging controller 105 to image the image (Step S108), and concludes the exposure target value establishing process shown in FIG. 2.

By so doing, the imaging controller 105 controls the imager 104 to initiate imaging. The imager 104 images the screen onto which the pattern image has been projected. At this time, the imaging controller 105, using the imaged image imaged by the imager, calculates the average value Lccd of the gradation values of all pixels of the image as the exposure target value, and then controls shutter speed, gain, aperture and so on in the imager 104 so that this calculated exposure value equals the exposure target value R established by the CPU 120, to carry out auto-exposure.

Once the imager 104 images the screen onto which the pattern image has been projected, the imaged image is output in the form of a digital image signal to the image processor 108. The image processor 108 performs the desired processing of the input digital image signal, and then writes this to the imaged image memory 106 to update the contents thereof.

The CPU 120 then reads out the digital image signal from the imaged image memory 106, acquires the imaged image, and analyzes the imaged image. Then, on the basis of the results of the analysis, it makes various adjustments.

A-4: Effects of Working Example:

FIG. 4 is an illustration showing tone values of pixels in the white portion of a imaged image, in an instance where zoom position has been changed. As in FIG. 11 and FIG. 12, at top in FIG. 4 are shown screens displaying adjustment pattern images; in the middle are shown imaged images of the screen; and at bottom are shown tone values of pixels in imaged images. (A) shows conditions where zoom position of the zoom lens is at a medial position, (B) shows conditions where zoom position is at the wide angle end, and (C) shows conditions where zoom position is at the telephoto end.

Where zoom position is at a medial position, as shown at bottom in FIG. 4(A), the gradation values of pixels of the white portion in the imaged image coincide with the desired gradation value Lt. In the embodiment, the exposure target value R changes according to Equation (5), depending on the zoom position of the zoom lens 116, i.e. the zoom level Z. Accordingly, where zoom-position is at the wide angle end (i.e. a higher zoom level Z) so that the area of the white portion in the imaged image is larger the average value Lccd of the gradation values of all pixels, i.e. the calculated exposure value, increases by the equivalent of the larger area, but the exposure target value R, in accordance with Equation (5), also increases by the equivalent of the increase in zoom level Z. As a result, even though the auto-exposure function operates to modify shutter speed gain, aperture and so on so that the calculated exposure value equals the exposure target value, since the average value of the gradation values of all pixels in the imaged image does not decline, in the embodiment, gradation values of pixels in the white portion can be substantially maintained at the desired gradation value Lt, as shown at bottom in FIG. 4(B).

If on the other hand zoom position is at the telephoto end (i.e. a lower zoom level Z) so that the area of the white portion in the imaged image is smaller, similarly, the average value Lccd of the gradation values of all pixels, i.e. the calculated exposure value, decreases by the equivalent of the smaller area, but the exposure target value R, in accordance with Equation (5), also decreases by the equivalent of the decrease in zoom level Z. As a result, even though the auto-exposure function operates to modify shutter speed, gain, aperture and so on so that the calculated exposure value equals the exposure target value, since the average value of the gradation values of all pixels in the imaged image does not increase, in the embodiment, gradation values of pixels in the white portion can be substantially maintained at the desired gradation value Lt, as shown at bottom in FIG. 4(C).

In this way, in this embodiment, despite change in zoom position of the zoom lens 116, the average value of the gradation values of the white portion in an imaged image can be substantially maintained at the desired gradation value Lt.

A-5: Modification Examples:

The invention is not limited to Embodiment 1 described hereinabove, and may be reduced to practice in various other forms without departing from the scope and spirit thereof.

A-5-1. Modification Example 1:

In Embodiment 1 hereinabove, the CPU 120 derives an exposure target value R depending on zoom level Z by means of a calculation in accordance with Equation (5), but the invention is not limited to this arrangement. For example, it would be acceptable instead to calculate or measure in advance, for each zoom level, an exposure target value R for that particular zoom level Z, and to store the results in the form of a exposure target value table, in the exposure target value table storage module 107 indicated by the dotted lines in FIG. 1. The CPU 120 would then read out and refer to the exposure target values in the exposure target value table storage module 107, to derive from the acquired zoom level Z a exposure target value R for that particular zoom level Z.

FIG. 5 is an illustration showing an example of an exposure target value table. In FIG. 5, (A) shows the contents of an exposure target value table, and (B) is a graph indicating the relationship between zoom level Z and exposure target value R derived from the exposure target value table. In some instances magnitude in relation to zoom level Z may be reversed, depending on the way encoder values are taken.

In this example, since the CCD of the imager 104 has 640×480 pixels, the area Sccd of the imaged image as a whole is 640×480. An all-white image of 4:3 aspect ratio is used as the adjustment pattern image, and in the case that the zoom position is furthest to the telephoto end, the area Sz of the white portion in the imaged image will be 300×225, whereas if furthest to the wide angle end, it will be 600×450. The desired gradation value Lt is designated as 200.

As shown in FIG. 5, exposure target value R increases in association with an increase in zoom level Z. That is, its value becomes smaller the closer zoom position of the zoom lens 116 is to the telephoto end, and large the closer zoom position is to the wide angle end.

Figures 5A, 5B:
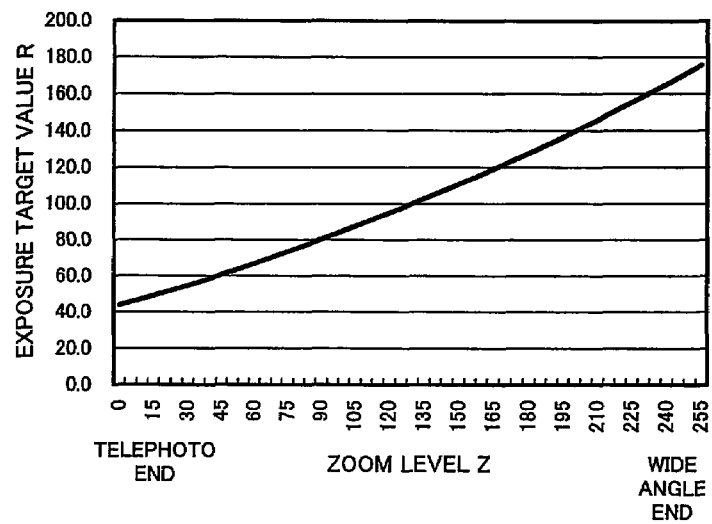
FIG. 5 is an illustration showing an example of an exposure target value table.

In the exposure target value table shown in FIG. 5(A), zoom value Z is listed as values in increments of "5"; in actual practice however, where a listed value is designated as "a", the exposure target value R corresponding to a value a is used for zoom level Z over a range of a −2.5<Z≦a+2.5, for example.

A-5-2. Modification Example 2:

In Embodiment 1 hereinabove, an all-white image is used as the adjustment pattern image, but the invention is not limited to this arrangement. Accordingly, suitable pattern images could be used as adjustment pattern images, depending on the particulars of the adjustments carried out subsequently.

As will be apparent from Equation (4), exposure target value R is dependent upon the area Sz of the white portion in an imaged image, but is not dependent on the shape of the white portion. Accordingly, as long as the area of the white portion is the same, any shape could be employed as the shape of the white portion serving as the adjustment pattern image, with no change in the exposure target values R calculated for zoom levels Z.

Also, rather than using an all-white pattern as the adjustment pattern image, where there is used an image in which the area of the white portion has been reduced to ⅓ by reducing the length of the white portion in the longitudinal direction to ⅓, the area Sz of the white portion in the imaged image will be given by Equation (2)'.

$$Sz=(⅓)×K×(k×Z+w0)^2 \qquad (2)'$$

Accordingly, exposure target value R will be represented as in Equation (5)'.

$$R=(1⅓)×K×(k×Z+w0)^2×Lt/Sccd \qquad (5)'$$

Thus, the smaller the area Sz of the white portion in the imaged image, the more gentle the curve representing the relationship of zoom level Z and exposure target value R.

Additionally, the adjustment pattern image need not be white, but could instead be some other specific color, such as green or gray.

A-5-3. Modification Example 3:

In Embodiment 1 hereinabove, the imaging controller 105 carries out auto-exposure by adjusting shutter speed, gain, aperture etc. in the imager 104, but the invention is not limited to this arrangement, it being acceptable instead to carry out auto-exposure by controlling any single parameter selected from shutter speed, gain, aperture etc., or to carry out auto-exposure by combining two or more of these parameters and controlling them.

A-5-4. Modification Example 4:

In Embodiment 1 hereinabove, a zoom level of "0" is assigned where the zoom position is at the limit on the telephoto end, whereas a value of "255" is assigned where at the limit on the wide angle end; however, the invention is not limited to these values, it being possible to instead assign a value other than "255" where at the limit on the wide angle end. Alternatively, a zoom level of "0" is assigned where the zoom position is at the limit on the wide angle end. An offset value may be provided to the zoom level. As long as the value corresponds to the zoom position of the zoom lens 116, a value other than actual zoom level could be used.

In the case of this Modification Example, it would be necessary to revise the aforementioned Equations (1)–(5) in accordance with the modification.

A-5-5. Modification Example 5:

In Embodiment 1 hereinabove, exposure target value is modified depending on zoom position, in such a way that the average value of gradation values of the white portion in an imaged image is substantially maintained equal to the desired gradation value; however, the invention is not limited thereto, it being possible to instead modify exposure target value in such a way that the average value of gradation values of the white portion is brought into equality with the desired gradation value.

The projector arrangement of this Modification Example is substantially identical to the arrangement of the projector 100 shown in FIG. 1. In this Modification Example, however, since there is no need to ascertain the zoom position of the zoom lens 116, i.e. the zoom level, the zoom lens position detector 122 is not needed.

Figure 6:
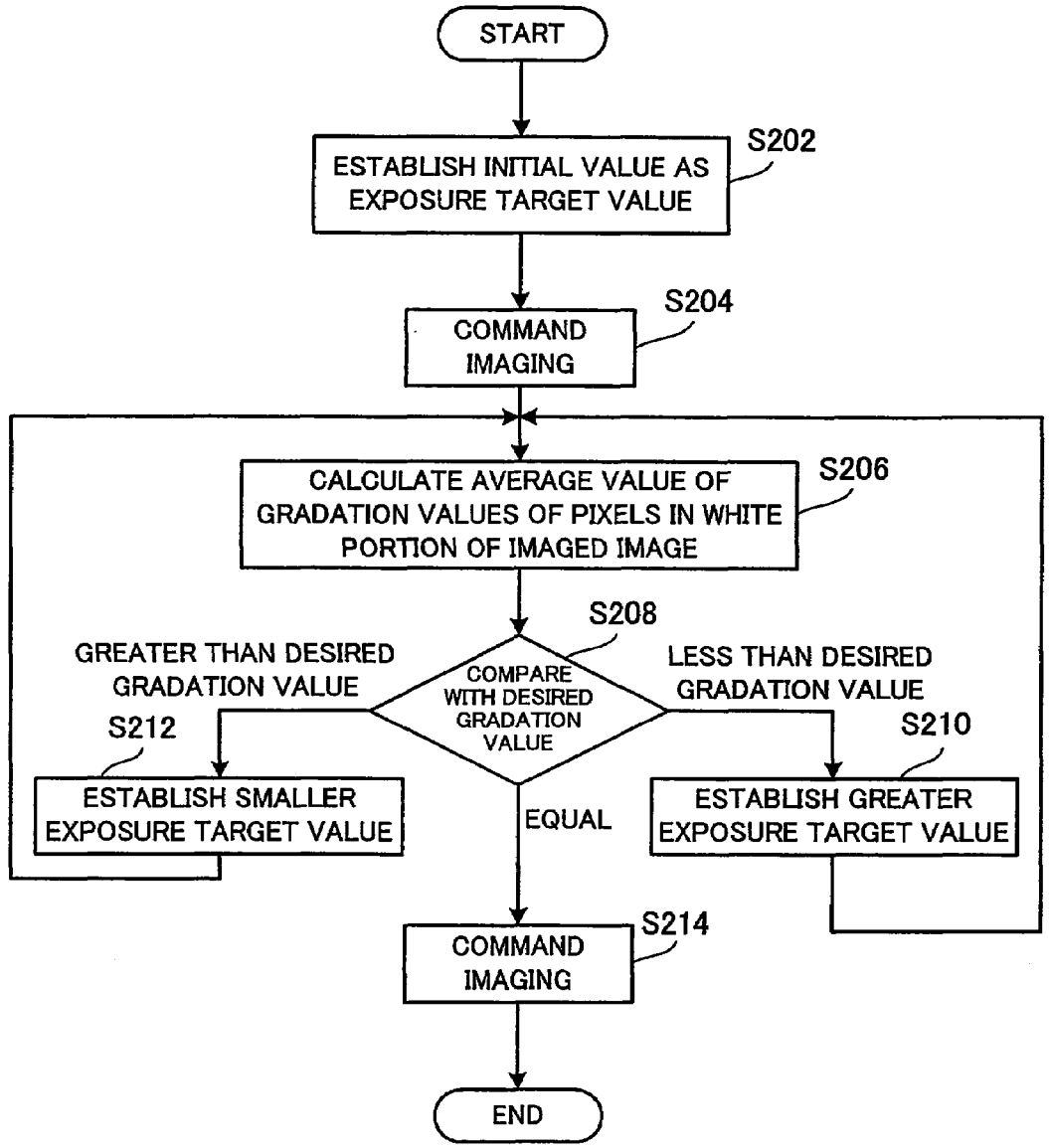
FIG. 6 is a flowchart showing the processing routine of the exposure target value establishing process in a modification example.

FIG. 6 is a flowchart showing the processing routine of the exposure target value establishing process in the Modification Example.

Where the user, by operating the Zoom button on the remote control 128, has moved the zoom position of the zoom lens 116 to a desired position, and the process shown in FIG. 6 has been initiated, the CPU 120 reads out the initial value from memory (not shown), and having designated this initial value as the exposure target value R and establishing it in the imaging controller 105 (Step S202), instructs the imaging controller 105 to image the image (Step S204). By so doing, the imaging controller 105 controls the imager 104 to initiate imaging, whereupon the imager 104 images an image of the screen on which the pattern image is displayed. At this time, the imaging controller 105 calculates a calculated exposure value from the image imaged by the imager 104, and performs auto-exposure by controlling shutter speed and so on in the imager 104, so that the calculated exposure value is brought into equality with the established exposure target value, i.e. with the initial value. The imaged image imaged by the imager 104, in the form of a digital image signal, is written via the image processor 108 to the imaged image memory 106, updating the contents thereof.

Next, the CPU 120 reads out the digital image signal from the imaged image memory 106, acquires the imaged image, and analyzes the imaged image to derive the average value of gradation values of the white portion in the imaged image (Step S206). The CPU 120 then reads out the desired gradation value Lt from memory (not shown), and compares the average value of gradation values of the white portion with the desired gradation value Lt (Step S208). In the event that the result is that the average value of gradation values of the white portion is less than the desired gradation value Lt, it establishes a value greater than the exposure target value previously established in the imaging controller 105, as the new exposure target value R in the imaging controller 105 (Step S210); conversely, if greater than the desired gradation value Lt, it establishes a value less than the exposure target value previously established in the imaging controller 105, as the new exposure target value R in the imaging controller 105 (Step S212). The CPU 120 then again acquires the imaged image from the imaged image memory 106, derives the average value of gradation values of the white portion in the imaged image, and subsequent performs the same process as described above, repeatedly until the average value of gradation values of the white portion is brought into equality with the desired gradation value Lt. Once, as a result of comparison, the average value of gradation values of the white portion has become equal to the desired gradation value Lt, the CPU 120 instructs the imaging controller 105 to perform imaging (Step S214). The imager 104 is already in the process of imaging, the imaging controller 105 causes the imager 104 to continue with imaging.

By means of operation as described above, in this Modification Example as well, it is possible to substantially maintain the average value of gradation values of the white portion in an imaged image so equals the desired gradation value.

Figure 7:
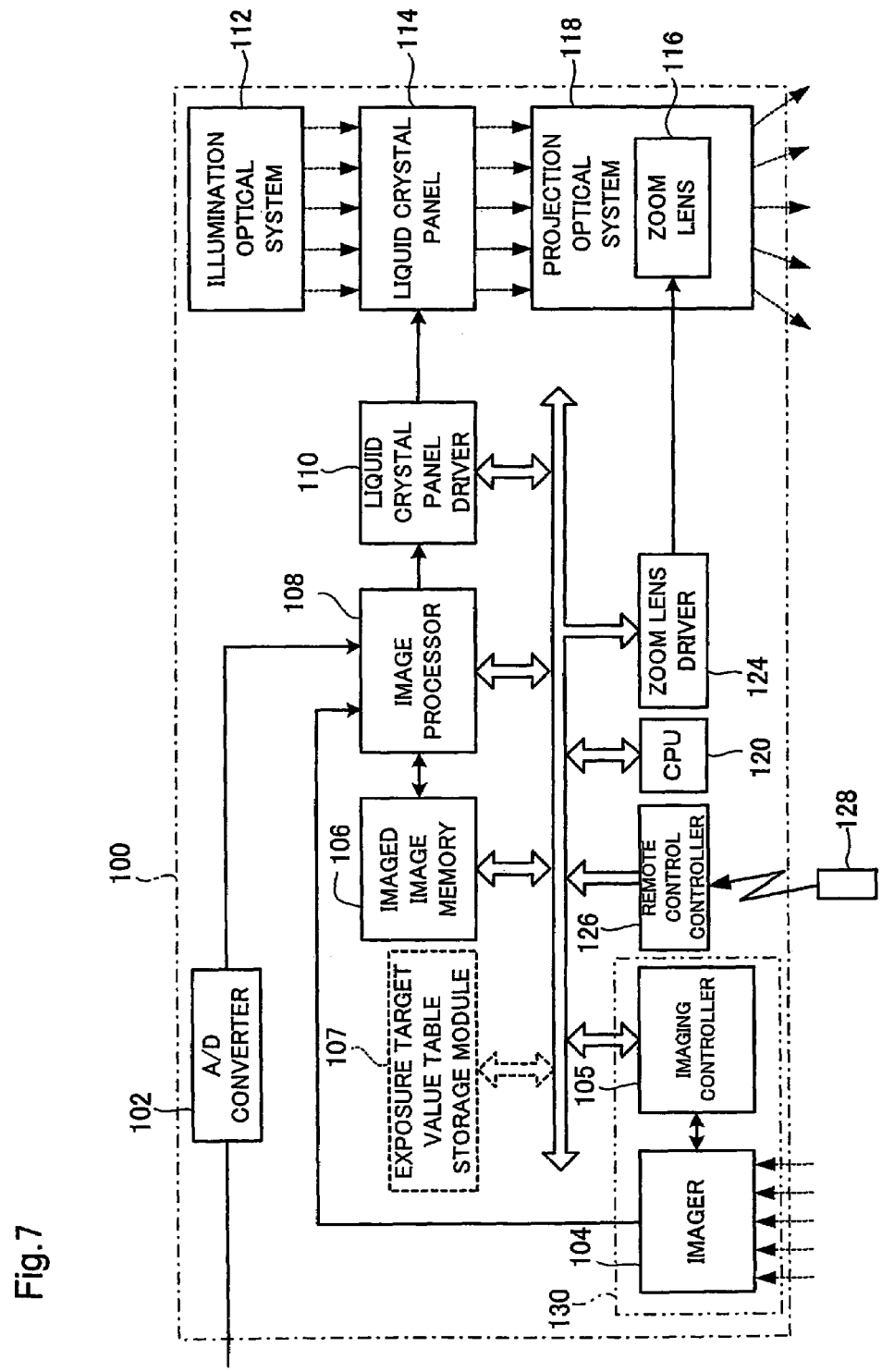
FIG. 7 is a block diagram showing the arrangement of the projector in a second embodiment of the invention.

B. Embodiment 2:

B-1. Projector Arrangement:

FIG. 7 is a block diagram showing the arrangement of the projector in a second embodiment of the invention. This projector 100 is a portable projector; as shown in FIG. 7 it comprises an A/D converter 102, an imager 104, an imaging controller 105, an imaged image memory 106, an image processor 108, a liquid crystal panel driver 110, an illumination optical system 112, a liquid crystal panel 114, a projection optical system 118 comprising a zoom lens 116, a CPU 120, a zoom lens driver 124, a remote control controller 126, and a remote control 128.

In FIG. 7, the CPU 120 is shown connected, via a bus, to only the imaging controller 105, imaged image memory 106, image processor 108, liquid crystal panel driver 110, zoom lens driver 124, and remote control controller 126; in actuality, however, other components are connected as well. The imager 104 comprises a CCD; the imager 104 and imaging controller 105 make up a CCD module 130 which serves as the monitor camera. In FIG. 7, the exposure target value table storage module 107 will be described later.

In the embodiment, the imager 104 shown in FIG. 7 corresponds to the imager recited in the Claims; the imaging controller 105 to the imaging controller recited in the Claims; the zoom lens 116 to the zoom lens recited in the Claims; and the CPU 120 to the controller recited in the Claims.

B-2. Image Projection Operation:

First, a brief description of the image projection operation which is the normal operation of the projector 100 is provided.

In FIG. 7, when the user, using the remote control 128, issues a command to initiate projection, the remote control 128 sends the input command wirelessly to the remote control controller 126. The remote control controller 126 then sends the command from the remote control 128 to the CPU 120 via the bus. On the basis of the command, the CPU 120 controls various components including the image processor 108, to carry out the image projection operation.

First, the A/D converter 102 inputs an image signal output by a video player, DVD player or the like, or an image signal output from a personal computer or the like, and coverts this analog image signal into a digital image signal, which is output to the image processor 108. The image processor 108 adjusts the input digital image signal so that image display conditions (e.g., luminance, contrast, sync, tracking, color density, tint, etc.) are brought to the desired conditions, and the signal is then output to the liquid crystal panel driver 110.

On the basis of the input digital image signal, the liquid crystal panel driver 110 drives the liquid crystal panel 114. By means of this, the liquid crystal panel 114, in accordance with the image information, modulates the illumination light emitted by the illumination optical system 112. The projection optical system 118 is mounted on the front of the housing of the projector 100, and projects projection light modulated by the liquid crystal panel 114 onto a screen (not shown). The image is projected onto the screen thereby.

B-3: Target Exposure Value Establishing Operation:

The exposure target value establishing operation, which is a characterizing feature of the invention in the projector 100, will now be described in detail.

As noted previously, in the past, the exposure target value used for auto-exposure by the monitor camera was always constant; in the embodiment however, the exposure target value is modified with reference to area of the white portion in the imaged image, so that the average value of gradation values of the white portion in an imaged image is substantially maintained at the desired gradation value, even if the zoom position of the zoom lens 116 should change.

Once the user has set up the projector 100 at the desired location in front of the screen, when the projector 100 is turned on, the projector 100 projects an adjustment pattern image into the screen, in order to perform various adjustments.

Specifically, the image processor 108 generates the adjustment pattern image, which is output as a digital image signal to the liquid crystal panel driver 110. As mentioned previously, the liquid crystal panel driver 110 drives the liquid crystal panel 114 on the basis of an input digital image signal, and the liquid crystal panel 114, in accordance with this image information, modulates the illumination light emitted by the illumination optical system 112. The projection optical system 118 then projects the projection light modulated by the liquid crystal panel 114 onto the screen, via the zoom lens 116 etc. By means of this process, the adjustment pattern image is displayed on the screen.

In this embodiment, an entirely white image is used as the adjustment pattern image, for example. Thus, as shown in FIG. 11 or FIG. 12, the area of the white portion displayed on the screen as the pattern image constitutes the projection light region.

Once the pattern image is displayed on the screen in this way, the user then operates the Zoom button (not shown) of the remote control 128 to issue a command to shift the zoom position, in order to adjust the size of the projection light region on the screen, whereupon the remote control 128 sends the input command wirelessly to the remote control controller 126. The remote control controller 126 then sends the command from the remote control 128 to the CPU 120 via the bus. On the basis of the command, the CPU 120 controls the zoom lens driver 124 to drive the zoom lens 116 provided in the projection optical system 118, shifting the zoom position of the zoom lens 116. Then, once the projection light region on the screen has reached the desired size, the user again operates the Zoom button of the remote control 128 to issue a command to halt shifting of the zoom position, whereupon the CPU 120 controls the zoom lens driver 124 on the basis of the command, to halt shifting of the zoom position of the zoom lens 116.

The CPU 120 reads from memory (not shown) and executes an exposure target value establishing process program. Specifically, in accordance with the processing routine shown in FIG. 8, the CPU 120 controls components including the imaging controller 105, to carry out the exposure target value establishing operation.

Figure 8:
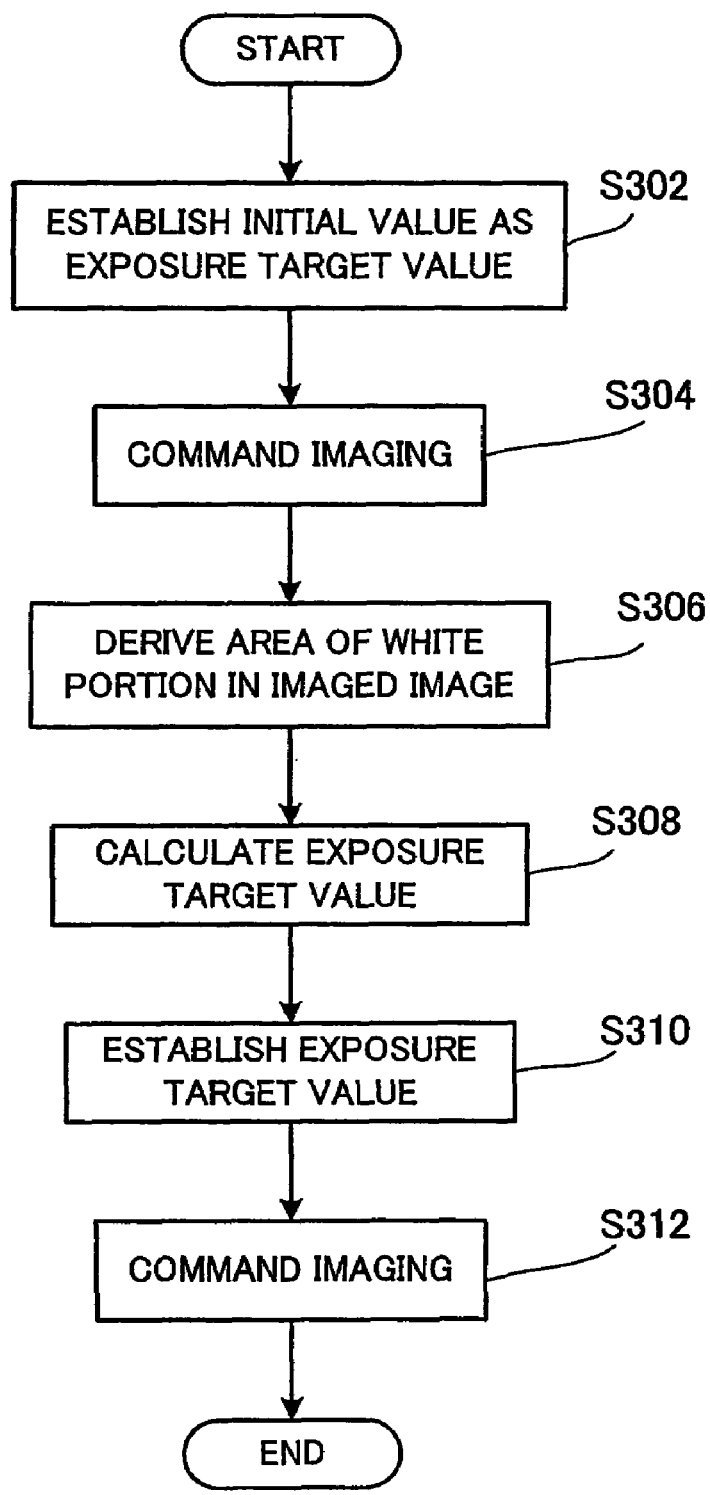
FIG. 8 is a flowchart showing the processing routine of the exposure target value establishing process in the projector of FIG. 7.

FIG. 8 is a flowchart showing the processing routine of the exposure target value establishing process in the projector of FIG. 7.

When the process shown in FIG. 8 is initiated, the CPU 120 reads out the initial value from memory (not shown), and having designated this initial value as the exposure target value R and establishing it in the imaging controller 105 (Step S302), instructs the imaging controller 105 to image the image (Step S304).

By so doing, the imaging controller 105 controls the imager 104 to initiate imaging. The imager 104 then images an image of the screen on which the pattern image is displayed. At this time, the imaging controller 105 calculates the average value Lccd of gradation values of all pixels, as a calculated exposure value from the image imaged by the imager 104, and performs auto-exposure by controlling shutter speed, gain, aperture and so on in the imager 104, so that the calculated exposure value is brought into equality with the exposure target value R established by the CPU 120, i.e. with the initial value.

Once the imager 104 images the screen onto which the pattern image has been projected, the imaged image is output in the form of a digital image signal to the image processor 108. The image processor 108 performs the desired processing of the input digital image signal, and then writes this to the imaged image memory 106 to update the contents thereof.

The CPU 120 then reads out the digital image signal from the imaged image memory 106, and performs a binarization process to acquire a black/white binary imaged image. It then analyzes the acquired imaged image, and derives the area of the white portion in the imaged image (Step S306). Since the area of the white portion is proportional to the number of pixels that are white pixels, by counting the number of pixels that are white pixels in the black/white binary imaged image, the CPU 120 can derive the area of the white portion.

Next, on the basis of the derived area of the white portion, the CPU 120 calculates a exposure target value for that particular area (Step S308). Specifically, exposure target value is calculated with reference to area of the white portion, by means of the following method. Here, the area of the white portion derived in the imaged image is denoted as Sz, and the exposure target value to be calculated is denoted as R.

The following description of the imaged image imaged by the CCD module 130 makes use of FIG. 3, which was referred to previously. In this embodiment as well, as described previously, an all-white is used as the adjustment pattern image, and thus in FIG. 3 the white portion of the imaged image constitutes the projection light region portion, while the black portion constitutes the portion outside the projection light region.

Where the average value of gradation values of the white portion in the imaged image is denoted as L, the area of the entire imaged image is designated as Sccd, and the average value of gradation values of all pixels in the imaged image is designated as Lccd, the average value Lccd is represented by Equation (3).

$$Lccd = Sz \times L / Sccd \quad (3)$$

In an imaged image, since the black portion (i.e. portion outside the projection light region) is dark enough to be ignored, gradation values of pixels situated in the black portion are considered to be 0.

Also, for a portion in an image whose pixel gradation values, while not 0, fall below a certain threshold value for example, the portion may be determined to be outside the projection light region, and calculation performed while substituting "0" for gradation values of the pixels in the portion.

As noted, in auto-exposure, the average value Lccd of gradation values of all pixels in an imaged image is used as the calculated exposure value, adjusting shutter speed, gain, aperture and so on so that the calculated exposure value Lccd is equal to the exposure target value R. Accordingly, by substituting R for Lccd in Equation (3), exposure target value R may be represented by Equation (4).

$$R = Sz \times L / Sccd \quad (4)$$

Accordingly, in order to substantially maintain the average value L of gradation values of the white portion in an imaged image at the desired gradation value Lt irrespective of the zoom position of the zoom lens 116, Lt is substituted for L in Equation (2) to derive Equation (6), and exposure target value R depending on white portion area Sz is calculated according to Equation (3).

$$R = Sz \times Lt / Sccd \quad (6)$$

Next, the CPU 120 establishes in the imaging controller 105 this exposure target value R that has been calculated according to white portion area Sz (Step S310), instructs the imaging controller 105 to image the image (Step S312), and concludes the exposure target value establishing process shown in FIG. 8.

At this time, since the imager 104 is already in the process of imaging, the imaging controller 105 causes the imager 104 to continue with imaging. The imaging controller 105 then calculates a calculated exposure value from the imaged image imaged by the imager 104, and performs auto-exposure by controlling the shutter speed, gain, aperture etc. in the imager 104 so that this calculated exposure value equals the newly established exposure target value R.

As described previously, the imaged image imaged by the imager 104 in this way is written in the form of a digital image signal via the image processor 108 to the imaged image memory 106, updating the contents thereof.

The CPU 120 then reads out the digital image signal from the imaged image memory 106, acquires the imaged image, and analyzes the imaged image. Then, on the basis of the results of the analysis, it makes various adjustments.

B-4: Effects of Embodiment:

The following description of gradation values of pixels of the white portion in the imaged image refers again to FIG. 4. As in FIG. 11 and FIG. 12, at top in FIG. 4 are shown screens displaying adjustment pattern images; in the middle are shown imaged images of the screen; and at bottom are shown gradation values of pixels in imaged images. (A) shows conditions where zoom position of the zoom lens is at a medial position, (B) shows conditions where zoom position is at the wide angle end, and (C) shows conditions where zoom position is at the telephoto end.

Where zoom position is at a medial position, as shown at bottom in FIG. 4(A), the gradation values of pixels of the white portion in the imaged image coincide with the desired gradation value Lt. In this embodiment, the exposure target value R changes according to Equation (6), depending on the white portion area Sz in the imaged image. Accordingly, where zoom position is at the wide angle end so that the area of the white portion in the imaged image is larger, the average value Lccd of the gradation values of all pixels, i.e. the calculated exposure value, increases by the equivalent of the larger area, but the exposure target value R, in accordance with Equation (6), also increases by the equivalent of the larger area Sz. As a result, even though the auto-exposure function operates to modify shutter speed, gain, aperture and so on so that the calculated exposure value equals the exposure target value, since the average value of the gradation values of all pixels in the imaged image does not decline, in the embodiment, gradation values of pixels in the white portion can be substantially maintained at the desired gradation value Lt, as shown at bottom in FIG. 4(B).

If on the other hand zoom position is at the telephoto end so that the white portion area Sz in the imaged image is smaller, similarly, the average value Lccd of the gradation values of all pixels, i.e. the calculated exposure value, decreases by the equivalent of the smaller area Sz, but the exposure target value R, in accordance with Equation (6), also decreases by the equivalent of the smaller area Sz. As a result, even though the auto-exposure function operates to modify shutter speed, gain, aperture and so on so that the calculated exposure value equals the exposure target value, since the average value of the gradation values of all pixels in the imaged image does not increase, in the embodiment, gradation values of pixels in the white portion can be substantially maintained at the desired gradation value Lt, as shown at bottom in FIG. 4(C).

In this way, in this embodiment, despite change in zoom position of the zoom lens 116, the average value of the gradation values of the white portion in an imaged image can be substantially maintained at the desired gradation value Lt.

B-5: Modification Examples:

The invention is not limited to Embodiment 2 described hereinabove, and may be reduced to practice in various other forms without departing from the scope and spirit thereof.

B-5-1: Modification Example 1:

In Embodiment 2 hereinabove, the CPU 120 derives an exposure target value R depending white portion area Sz in an imaged image, by means of calculation in accordance with Equation (6), but the invention is not limited to this arrangement. For example, it would be acceptable instead to calculate or measure in advance, for each white portion area Sz, an exposure target value R for the particular area Sz, and to store the results in the form of a exposure target value table, in the exposure target value table storage module 107 indicated by the dotted lines in FIG. 7. The CPU 120 would then read out and refer to the exposure target values in the exposure target value table storage module 107, to derive from the derived white portion area Sz a exposure target value R for that particular area Sz.

Figure 9:
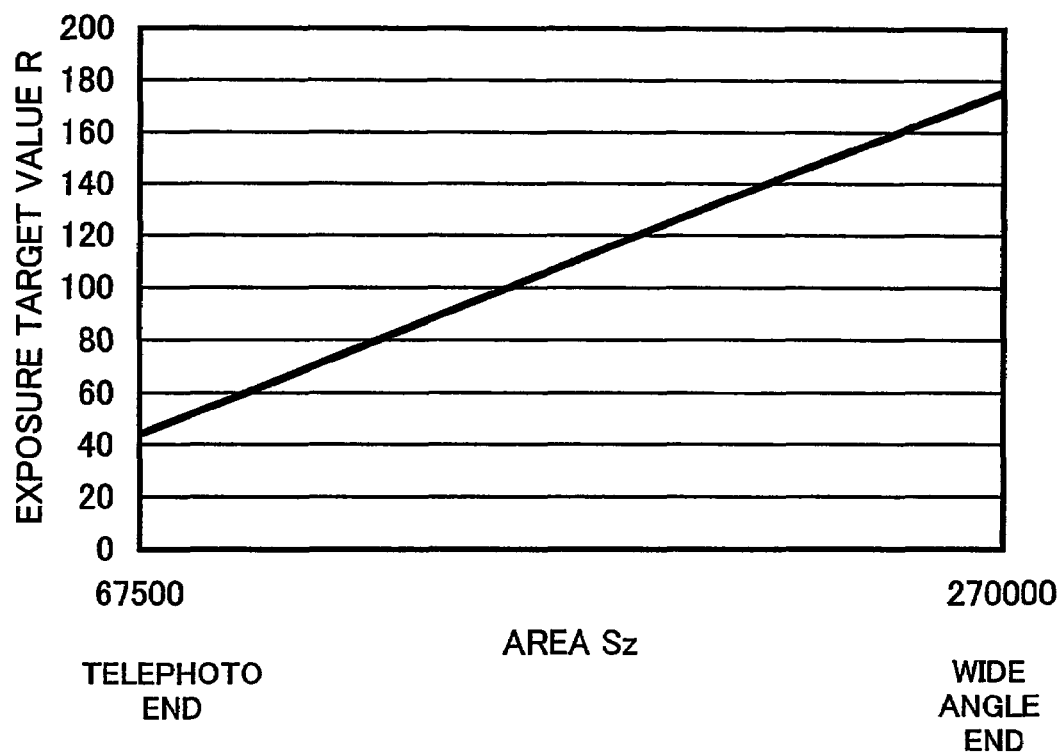
FIG. 9 is an illustration showing an example of an exposure target value table in a first modification example.

FIG. 9 is a graph showing the relationship of white portion area Sz to exposure target values R, obtained from such an exposure target value table.

In this example, since the CCD of the imager 104 has 640×480 pixels, the area Sccd of the imaged image as a whole is 640×480. An all-white image of 4:3 aspect ratio is used as the adjustment pattern image, and in the case that the zoom position is furthest to the telephoto end, the white portion area Sz in the imaged image will be 300×225, whereas if furthest to the wide angle end, it will be 600×450. The desired gradation value Lt is designated as 200.

As shown in FIG. 9, exposure target value R increases proportionally in association with an increase in white portion area Sz in the imaged image. That is, with zoom position of the zoom lens 116 at the telephoto end, the value of the exposure target value R is smaller the smaller the white portion area Sz in the imaged image; and at the wide angle end, is larger the larger the area Sz.

B-5-2: Modification Example 2:

In Embodiment 2 hereinabove, exposure target value R varies depending on the white portion area Sz in the imaged image; however, the value need not be area Sz, and may be some other value related to area Sz instead. For example, as shown in FIG. 3, in the imaged image, where the horizontal side length of the white portion is denoted as w, and the vertical side length is denoted as h, the white portion area Sz is given by Equation (7).

$$Sz = w \times h \quad (7)$$
$$= K \times w \times w$$
$$= K \times w^2$$

K is a coefficient that depends on the aspect ratio. For example, where the aspect ratio of the pattern image is 4:3, K=¾.

Accordingly, by substituting Equation (7) for Sz in Equation (6), exposure target value R is given by Equation (8).

$$R = K \times w^2 \times Lt / Sccd \quad (8)$$

Figures 10A, 10B:
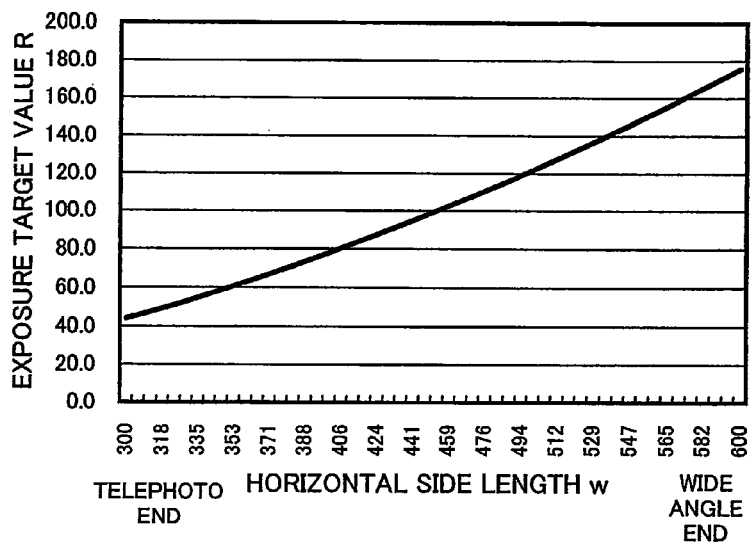
FIG. 10 is an illustration showing an example of an exposure target value table in a second modification example.

Accordingly, in order to substantially maintain the average value of gradation values of the white portion in an imaged image at the desired gradation value Lt irrespective of change in zoom position of the zoom lens 116, it suffices to calculate the exposure target value R with reference to horizontal side length w of the white portion, in accordance with Equation (5).

Where exposure target value R depending on length w is calculated for each length w of the horizontal sides to generate a exposure target value table, the result is as shown in FIG. 10.

FIG. 10 is an illustration showing an example of such an exposure target value table. In FIG. 10, (A) shows the contents of the exposure target value table, and (B) is a graph showing the relationship between exposure target values R and the white area horizontal side length w of the white portion.

The number of pixels of the CCD of the imager, and the content of the adjustment pattern image, are the same as in FIG. 9.

As shown in FIG. 10, exposure target value R increases monotonically, in association with longer horizontal side length w of the white portion. That is, with zoom position of the zoom lens 116 at the telephoto end, the value of the exposure target value R is smaller the shorter the horizontal side length w of the white portion; and at the wide angle end, is larger the longer the length w.

B-5-3: Modification Example 3:

In Embodiment 2 hereinabove, an all-white image is used as the adjustment pattern image, but the invention is not limited to this arrangement. Accordingly, suitable pattern images could be used as adjustment pattern images, depending on the particulars of the adjustments carried out subsequently.

As will be apparent from Equation (6), exposure target value R is dependent upon the area Sz of the white portion in an imaged image, but is not dependent on the shape of the white portion. Accordingly, as long as the area of the white portion is the same, any shape could be employed as the shape of the white portion serving as the adjustment pattern image, with no change in the exposure target values R calculated with reference to white portion area Sz.

Also, rather than using an all-white pattern as the adjustment pattern image, there could instead be used an image in which the white portion area has been reduced to ⅓ by reducing the length of the white portion in the longitudinal direction to ⅓.

Additionally, the adjustment pattern image need not be white, but could instead be some other specific color, such as green or gray.

B-5-4. Modification Example 4:

In Embodiment 2 hereinabove, the imaging controller 105 carries out auto-exposure by adjusting shutter speed, gain, aperture etc. in the imager 104, but the invention is not limited to this arrangement, it being acceptable instead to carry out auto-exposure by controlling any single parameter selected from shutter speed, gain, aperture etc., or to carry out auto-exposure by combining two or more of these parameters and controlling them.

What is claimed is:

1. A projector for projecting projection light onto a projection target to cause an image to be displayed thereon, comprising:
    a zoom lens enabling change of projection light region of projected projection light;
    a zoom lens position detector that detects zoom position of the zoom lens;
    a controller;
    an imager that images the projection target; and
    an imaging controller that calculates a calculated exposure value from an imaged image imaged by the imager, and performs exposure adjustment in the imager such that the calculated exposure value becomes approximately equivalent to an exposure target value set by the controller,
    wherein the controller acquires the zoom position detected by the zoom lens position detector, and changes the exposure target value to be set in the imaging controller in accordance with the acquired zoom position.

2. The projector according to claim 1 wherein the controller calculates an exposure target value on the basis of the acquired zoom position such that the average value of gradation values of a specific color portion represented by specific color in an imaged image imaged by the imager becomes approximately equivalent to a desired gradation value irrespective of change in the zoom position, and sets the exposure target value in the imaging controller.

3. The projector according to claim 1 wherein an exposure target value table is provided in advance, the table having established therein, in association with each zoom position of the zoom lens, exposure target values that make the average value of gradation values of a specific color portion represented by specific color in an imaged image imaged by the imager substantially equal to a desired gradation value irrespective of change in the zoom position, and
    wherein the controller, on the basis of the acquired zoom position, makes reference to the exposure target value table to derive the exposure target value corresponding to the zoom position, and sets the exposure target value in the imaging controller.

4. An exposure adjustment method of performing exposure adjustment in an imager of a projector, which projects projection light onto a projection target to cause an image to be displayed thereon and comprises a zoom lens enabling change of the projection light region of projected projection light and the imager that images the projection target, the exposure adjustment method comprising the steps of:
    (a) detecting zoom position of the zoom lens;
    (b) deriving an exposure target value depending on the zoom position on the basis of the detected the zoom position; and
    (c) calculating a calculated exposure value from the imaged image imaged by the imager, and performing exposure adjustment in the imager such that the calculated exposure value becomes approximately equivalent to the exposure target value.

5. The exposure adjustment method according to claim 4 wherein the step (b) derives, as the exposure target value depending on the zoom position, a value that brings the average value of gradation values of a specific color portion represented by specific color in an imaged image imaged by the imager, into substantial equivalence with a desired gradation value irrespective of change in the zoom position.

* * * * *